United States Patent
Kudoh (10) Patent No.: US 9,411,126 B2
(45) Date of Patent: Aug. 9, 2016

(54) LENS BARREL HAVING RETRACTABLE LENS, AND IMAGE PICKUP APPARATUS

(71) Applicant: CANON KABUSHIKI KAISHA, Tokyo (JP)

(72) Inventor: Tomoyuki Kudoh, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/254,781

(22) Filed: Apr. 16, 2014

(65) Prior Publication Data
US 2014/0313602 A1    Oct. 23, 2014

(30) Foreign Application Priority Data
Apr. 17, 2013 (JP) ................................. 2013-086664

(51) Int. Cl.
G02B 7/02 (2006.01)
G02B 7/10 (2006.01)

(52) U.S. Cl.
CPC ...................................... *G02B 7/102* (2013.01)

(58) Field of Classification Search
CPC .................................... G02B 7/02; G02B 7/04
USPC .............. 359/817, 819, 811, 642; 396/73, 75, 396/348–350
See application file for complete search history.

(56) References Cited

U.S. PATENT DOCUMENTS

| 7,194,203 | B2 * | 3/2007 | Omiya et al. .................... 396/75 |
| 7,527,438 | B2 * | 5/2009 | Nomura et al. ................ 396/349 |
| 7,773,871 | B2 * | 8/2010 | Ishizuka ......................... 396/73 |
| 2007/0177865 | A1 | 8/2007 | Nomura et al. |

FOREIGN PATENT DOCUMENTS

| CN | 201015007 Y | 1/2008 |
| JP | 2003-029186 A | 1/2003 |
| JP | 2008-046504 A | 2/2008 |
| JP | 2009-086475 A | 4/2009 |
| JP | 2012-058354 A | 3/2012 |

OTHER PUBLICATIONS

Dec. 21, 2015 Chinese Office Action, which is enclosed with an English Translation, that issued in Chinese Patent Application No. 201410148008.2.

* cited by examiner

*Primary Examiner* — Tuyen Tra
(74) *Attorney, Agent, or Firm* — Cowan, Liebowitz & Latman, P.C.

(57) ABSTRACT

A lens barrel which is capable of retracting a retractable lens group by a simple construction and realizing stable image quality. The lens barrel has a lens, a first lens holding member that holds the lens, a second lens holding member that holds the first lens holding member and moves in a direction of an optical axis in conjunction with the first lens holding member, a drive mechanism that moves the first lens holding member between a shooting position on the optical axis and a retracted position outside the optical axis, and a first guide bar and a second guide bar. The drive mechanism retracts the first lens holding member from the shooting position to the retracted position while holding the second lens holding member on the optical axis. The first and second guide bars guide the second lens holding member in the direction of the optical axis.

8 Claims, 9 Drawing Sheets

LENS BARREL HAVING RETRACTABLE LENS, AND IMAGE PICKUP APPARATUS

BACKGROUND OF THE INVENTION

1. Field of the Invention

The present invention relates to an image pickup apparatus such as a digital still camera or a digital video camera, and a lens barrel which the image pickup apparatus has.

2. Description of the Related Art

Digital cameras which are capable of taking an image of a subject using an image pickup device such as a CCD or a CMOS and capturing the taken image into memory have been in widespread use. Such digital cameras perform an optical zooming operation in which the shooting angle of view is varied by changing the spacing between a plurality of taking lens groups. In recent years, there has been an increasing demand for higher optical zoom rate and thinner camera bodies, and realization of an arrangement that enables increase in the stroke of a taking lens group and miniaturization of a camera main body has been required.

Accordingly, when a taking lens barrel is collapsed into a camera main body, a lens group inside the taking lens barrel is laterally retracted from the center of an optical axis so that the taking lens barrel as a whole can be slimmed down. For example, a group-3 lens which is one of within-group lenses is retracted in the taking lens barrel in a direction perpendicular to the optical axis so that the taking lens barrel as a whole can be slimmed down (see Japanese Laid-Open Patent Publication (Kokai) No. 2008-46504). There has also been proposed an arrangement in which at the time of collapsing when a zoom motor is run to rotate a rotary cylinder, a lever is turned with rotation of the rotary cylinder and brought into abutment with a lens holder to rotate the lens holder, causing the lens holder to retract to the outside of the rotary cylinder (see Japanese Laid-Open Patent Publication (Kokai) No. 2012-58354).

The technique described in Japanese Laid-Open Patent Publication (Kokai) No. 2008-46504 is effective for an arrangement having a number of lens groups, but when there is only a small number of lens groups, for example, three lens groups, it is difficult to secure a space for the lens groups to retract. Also, the technique described in Japanese Laid-Open Patent Publication (Kokai) No. 2012-58354 has a problem that a structure for retracting the lens holder is complicated. When the lens groups held by the lens holder lies on an optical axis, the lens holder is in a one-side abutting state, and image quality may be unstable due to irregularities in operation.

SUMMARY OF THE INVENTION

The present invention provides a lens barrel which is capable of retracting a retractable lens group by a simple construction and realizing stable image quality.

Accordingly, a first aspect of the present invention provides a lens barrel comprising a lens, a first lens holding member configured to hold the lens, a second lens holding member configured to hold the first lens holding member and be movable in a direction of an optical axis in conjunction with the first lens holding member, a drive mechanism configured to move the first lens holding member between a shooting position on the optical axis and a retracted position outside the optical axis, and a first guide bar and a second guide bar configured to support the second lens holding member, wherein the drive mechanism retracts the first lens holding member from the shooting position to the retracted position while holding the second lens holding member on the optical axis, and the first guide bar and the second guide bar guide the second lens holding member in the direction of the optical axis.

Accordingly, a second aspect of the present invention provides an image pickup apparatus comprising a lens barrel comprising, a lens, a first lens holding member that holds the lens, a second lens holding member that holds the first lens holding member and is movable in a direction of an optical axis in conjunction with the first lens holding member, a drive mechanism that moves the first lens holding member between a shooting position on the optical axis and a retracted position outside the optical axis, and a first guide bar and a second guide bar that support the second lens holding member, wherein the drive mechanism retracts the first lens holding member from the shooting position to the retracted position while holding the second lens holding member on the optical axis, and the first guide bar and the second guide bar guide the second lens holding member in the direction of the optical axis.

According to the present invention, the first lens holding member which holds the lens is able to move in the direction of the optical axis in conjunction with the second lens holding member supported by the first guide bar and the second guide bar. Also, the drive mechanism moves the first lens holding member between the shooting position and the retracted position. Thus, the lens can be moved and retracted in the direction of the optical axis by a simple construction. Further, because the second lens holding member is supported in a stable condition, the lens can also be held in a stable condition, and as a result, image quality can be stable.

Further features of the present invention will become apparent from the following description of exemplary embodiments (with reference to the attached drawings).

DESCRIPTION OF THE EMBODIMENTS

Figure 1A:
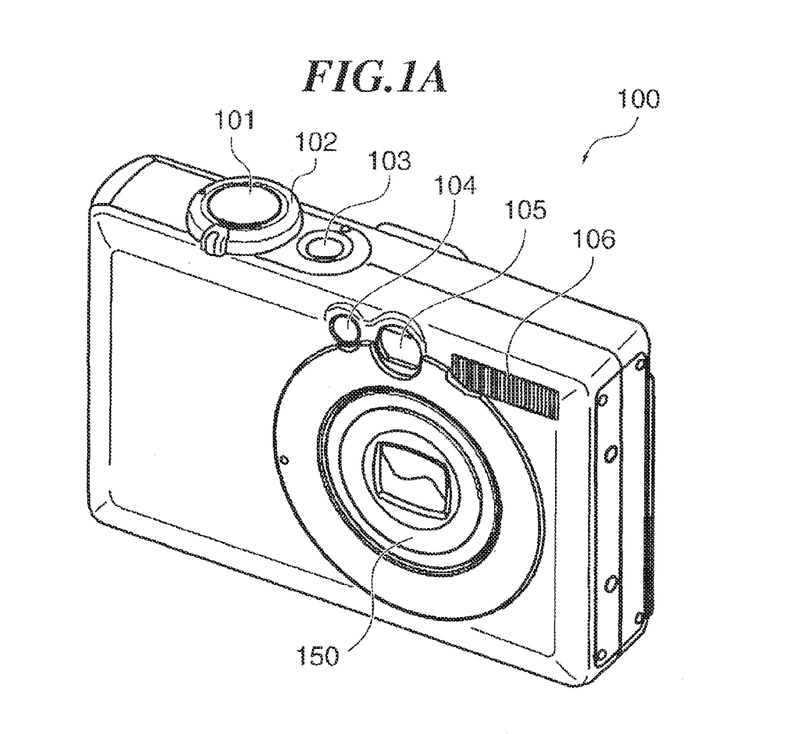
FIGS. 1A and 1B are a perspective view and a rear view, respectively, showing an appearance of a digital camera which is an exemplary image pickup apparatus having a taking lens barrel according to an embodiment of the present invention.
Figure 1B:
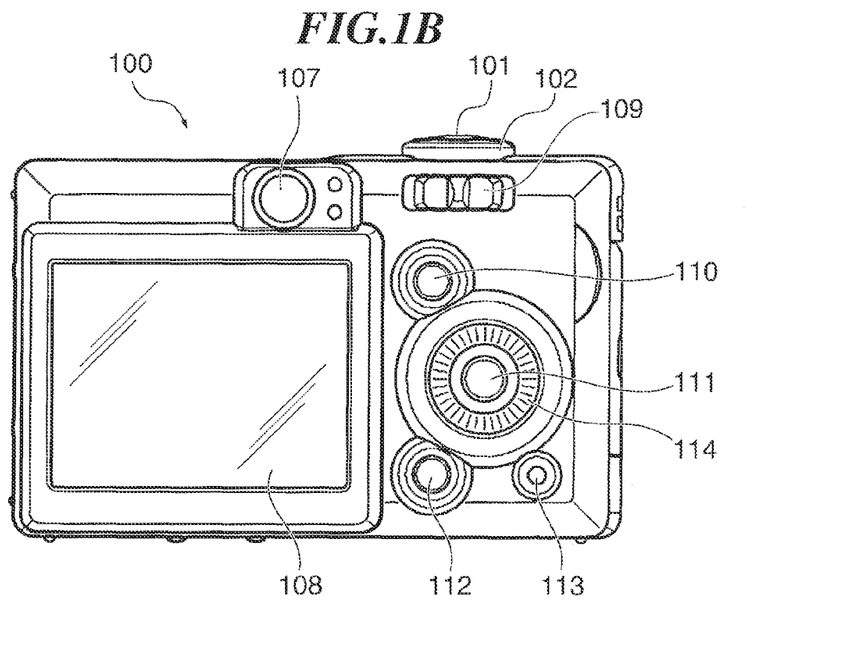

An embodiment of the present invention will now be described in detail with reference to the drawings. FIG. 1A is a perspective view showing an appearance of a digital camera which is an exemplary image pickup apparatus having a taking lens barrel according to the present embodiment. FIG. 1B is a rear view showing the digital camera in FIG. 1A.

The digital camera 100 in FIGS. 1A and 1B is equipped with a taking lens barrel 150 having a zooming mechanism capable of varying shooting magnification. It should be noted that an arrangement of the taking lens barrel 150 will be described later in detail. A shutter release button 101, a zoom rate selection switch 102, and a power selection button 103 are provided on an upper surface of a main body of the digital camera 100. An auxiliary light, irradiation opening 104, which provides auxiliary light when photometric measurement and distance measurement are performed, a viewfinder 105, and an electronic flash. 106 are disposed in an upper portion of a front surface of the main body of the digital camera 100.

Operation buttons 109, 110, 111, 112, 113, and 114 are disposed on a rear surface of the main body of the digital camera 100. By operating these operation buttons 109 to 114, a user can switch various functions of the digital camera 100. A finder eyepiece 107 for visually identifying a subject, and a display 108 comprised of a liquid crystal panel are disposed on the rear surface of the main body of the digital camera 100. A subject being shot, an image stored in a memory 214 (see FIG. 2), an image read from a memory card drive 216 (see FIG. 2), menu screens associated with operation of the operation buttons 109 to 114, and so on can be displayed on the display 108.

Figure 2:
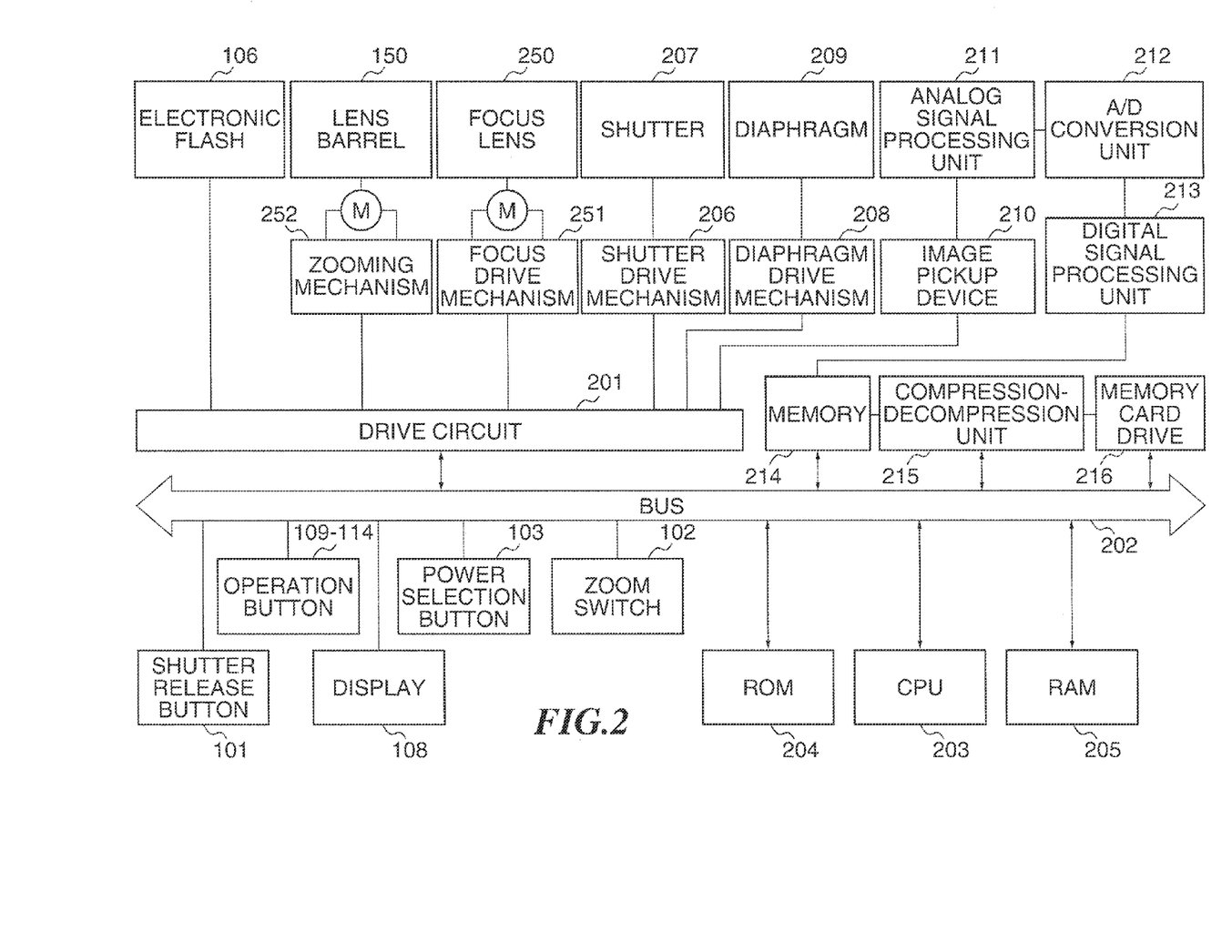
FIG. 2 is a block diagram schematically showing an arrangement or the digital camera in FIGS. 1A and 1B.

FIG. 2 is a block diagram schematically showing an arrangement of the digital camera 100. It should be noted that among component elements of the digital camera 100 in FIG. 2, those which are identical with the component elements shown in FIGS. 1A and 1B are designated by the same reference numerals, and description thereof is omitted.

The digital camera 100 has a drive circuit 201, and a CPU 203 which constitutes a control unit, a ROM 204, and a RAM 205, and they are connected to each other via a bus 202 such that they can communicate with each other. The CPU 203 is responsible for controlling the overall operation of the digital camera 100. Programs, which are required to perform various functions of the digital camera 100, and others are stored in the ROM 204, and data, which is required for various control programs, and others are stored in the RAM 205. The CPU 203 expands programs, which are stored in the ROM 204, into the RAM 205 and executes them to control various drive elements constituting the digital camera 100.

The shutter release button 101, the zoom rate selection switch 102, the power selection button 103, the display 108, the operation buttons 109 to 114, the memory 214, a compression-decompression unit 215, and the memory card drive 216 are connected to the bus 202. A focus drive mechanism 251, a zooming mechanism. 252, a shutter drive mechanism 206, a diaphragm drive mechanism 208, an image pickup device 210 such as a CCD or a CMOS, and the electronic flash 106 are connected to the drive circuit 201. In accordance with instruction signals from the CPU 203, the drive circuit 201 operates various drive mechanisms and others connected to the drive circuit 201.

The focus drive mechanism 251 drive a focus lens 250. The zooming mechanism 252 controls zooming of the taking lens barrel 150. The shutter drive mechanism 206 drives a shutter 207. The diaphragm drive mechanism 208 drives a diaphragm 209. An analog electric signal output from the image pickup device 210 is input to an analog signal processing unit 211, which in turn subjects the obtained analog electric signal to predetermined processing and outputs the resulting analog electric signal to an A/D conversion unit 212.

The A/D conversion unit 212 converts the obtained, analog electric signal into a digital signal and outputs the generated digital signal to a digital signal processing unit 213. The digital signal processing unit 213 subjects the digital signal to predetermined processing and stores the digital signal in the memory 214. Image data stored in the memory 214 and image data stored in the memory card drive 216 are subjected to an expansion process by the compression-decompression unit 215, and the decompressed image data is displayed on the display 108 via the bus 202.

Figure 3:
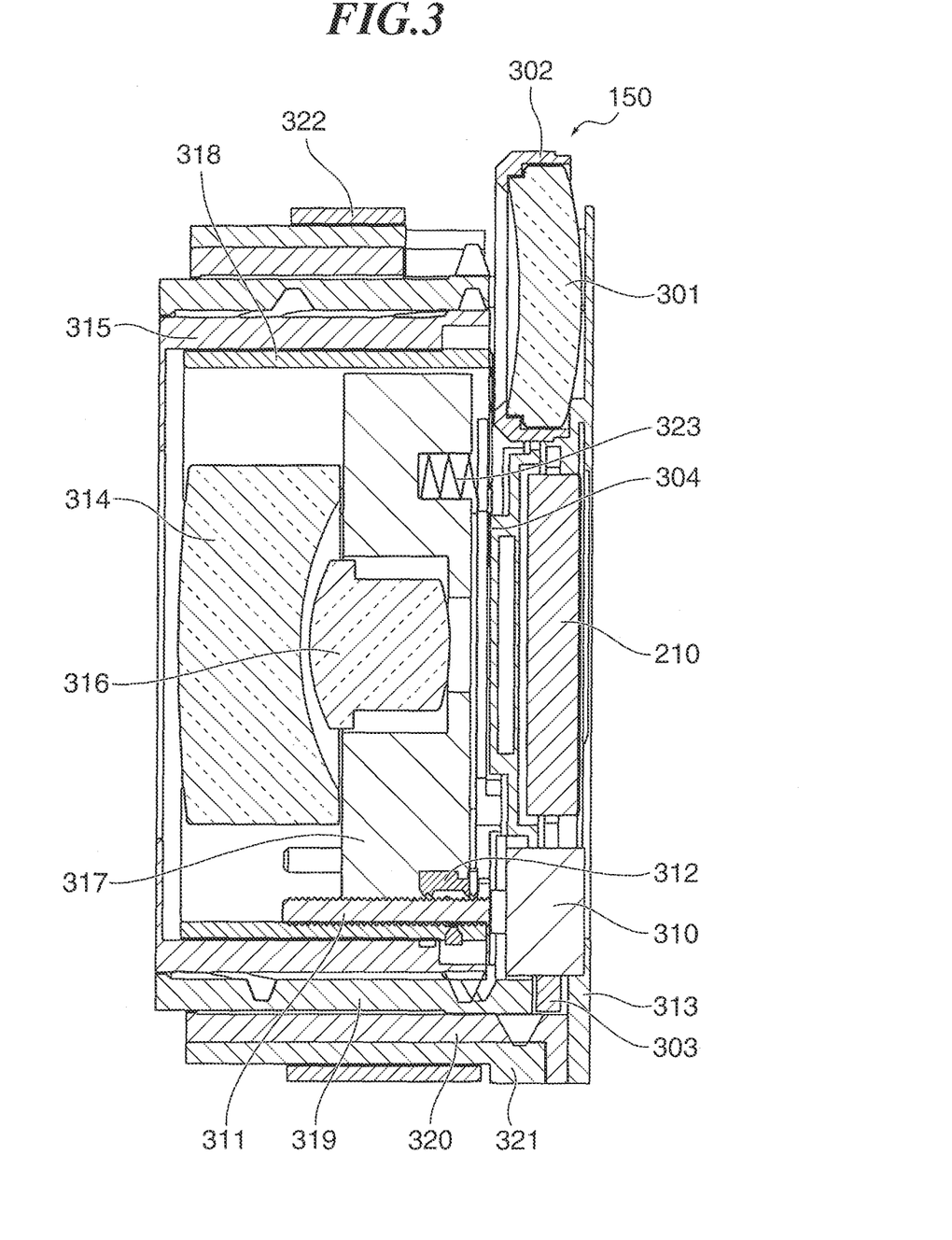
FIG. 3 is a cross-sectional view showing the taking lens barrel, which the digital camera in FIGS. 1A and 1B has, in a retracted state.
Figure 4:
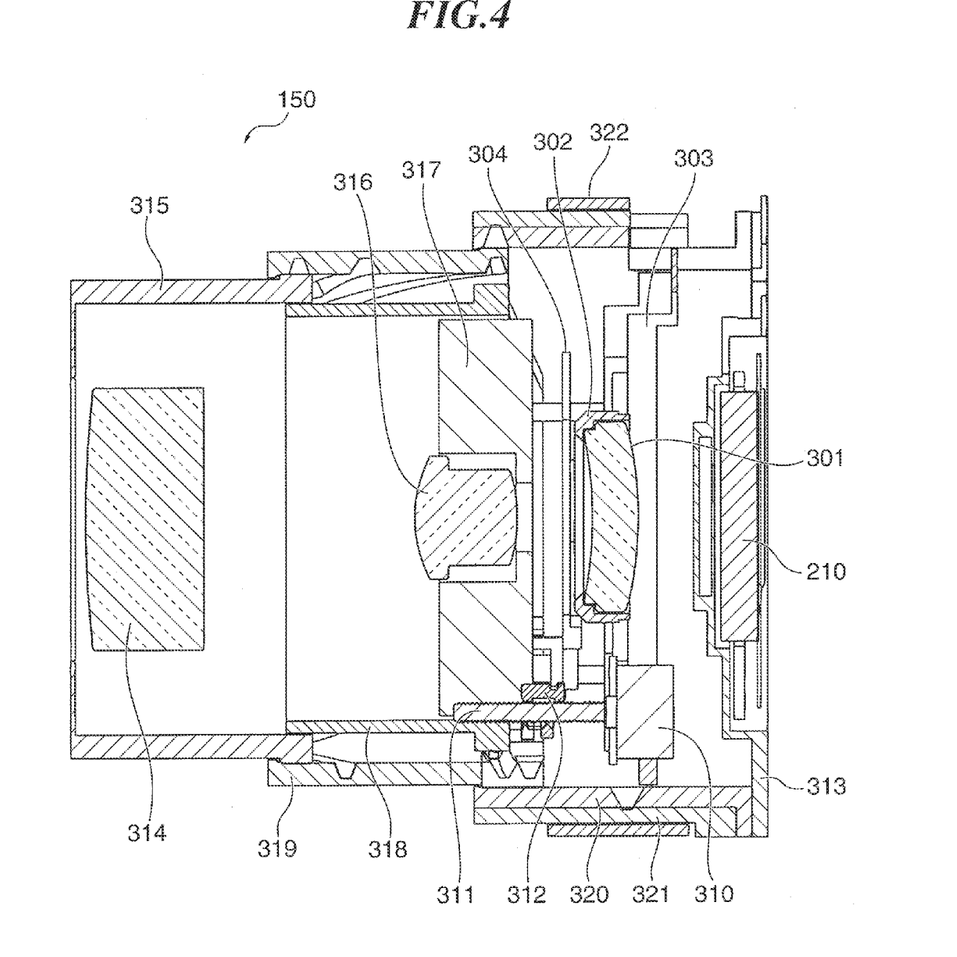
FIG. 4 is a cross-sectional view showing the taking lens barrel in FIG. 3 in an extended state.

FIG. 3 is a cross-sectional view showing the taking lens barrel 150 in a retracted state (collapsed state). FIG. 4 is a cross-sectional view showing the taking lens barrel 150 in a shooting state (used state (extended state)). The taking lens barrel 150 shifts from the shooting state into the retracted state by a collapsing action and shifts from the retracted state into the shooting state by an extending action. The taking lens barrel 150 has a retractable lens group 301, a first lens group 314, and a second lens group 316.

The first lens group 314 is held by a first lens group holding member 315. The second lens group 316, which is disposed behind the first lens group 314 (on the image pickup device 210 side (image plane side)) and held by a second lens group holding member 317. The retractable lens group 301, which is the focus lens 250 shown in FIG. 2, is held by a retractable lens group holding member 302 and disposed behind the second lens group 316. A moving cam ring 319 is disposed on an outer periphery of the first lens group holding member 315, and a straight advance cylinder 318 is disposed on an inner periphery of the first lens group holding member 315. The moving cam ring 319 and the straight advance cylinder 318, which are bayonet-coupled to each other, are rotatable with respect to each other and integrally move in a direction of an optical axis.

A fixed cam ring 320 is disposed on an outer periphery of the moving cam ring 319, a drive ring 321 is disposed on an outer periphery of the fixed cam ring 320, and a holding cylinder 322 is disposed on an outer periphery of the drive ring 321. The drive ring 321 is caused to rotate by power transmitted from the zooming mechanism 252, and rotative force of the drive ring 321 rotates the moving cam ring 319. Here, a cam groove is provided on an inner periphery of the fixed cam ring 320, and the moving cam ring 319 follows this cam groove to move in the direction of the optical axis while rotating. On this occasion, the straight advance cylinder 318 moves integrally with the moving cam ring 319 in the direction of the optical axis, but the straight advance cylinder 318 is inhibited from rotating and caused to advance straight by the fixed cam ring 320.

A plurality of cam grooves is provided on an inner periphery of the moving cam ring 319, enabling the first lens group holding member 315 and the second lens group holding member 317 to follow the cam grooves with different cam paths. The first lens group holding member 315 and the second lens group holding member 317 are caused to advance straight by the straight advance cylinder 318, and hence they move in the direction of the optical axis without rotating. The image pickup device 210 is disposed on the rearmost surface of the taking lens barrel 150 and held by an image pickup device holding member 313. It should be noted that a moving group 303, a moving base 304, a lead screw 311, a stepping motor 310, a nut 312, and a retractable group lifting preventive spring 323 in FIGS. 3 and 4 will now be described with reference to FIGS. 5 to 7.

Figure 5:
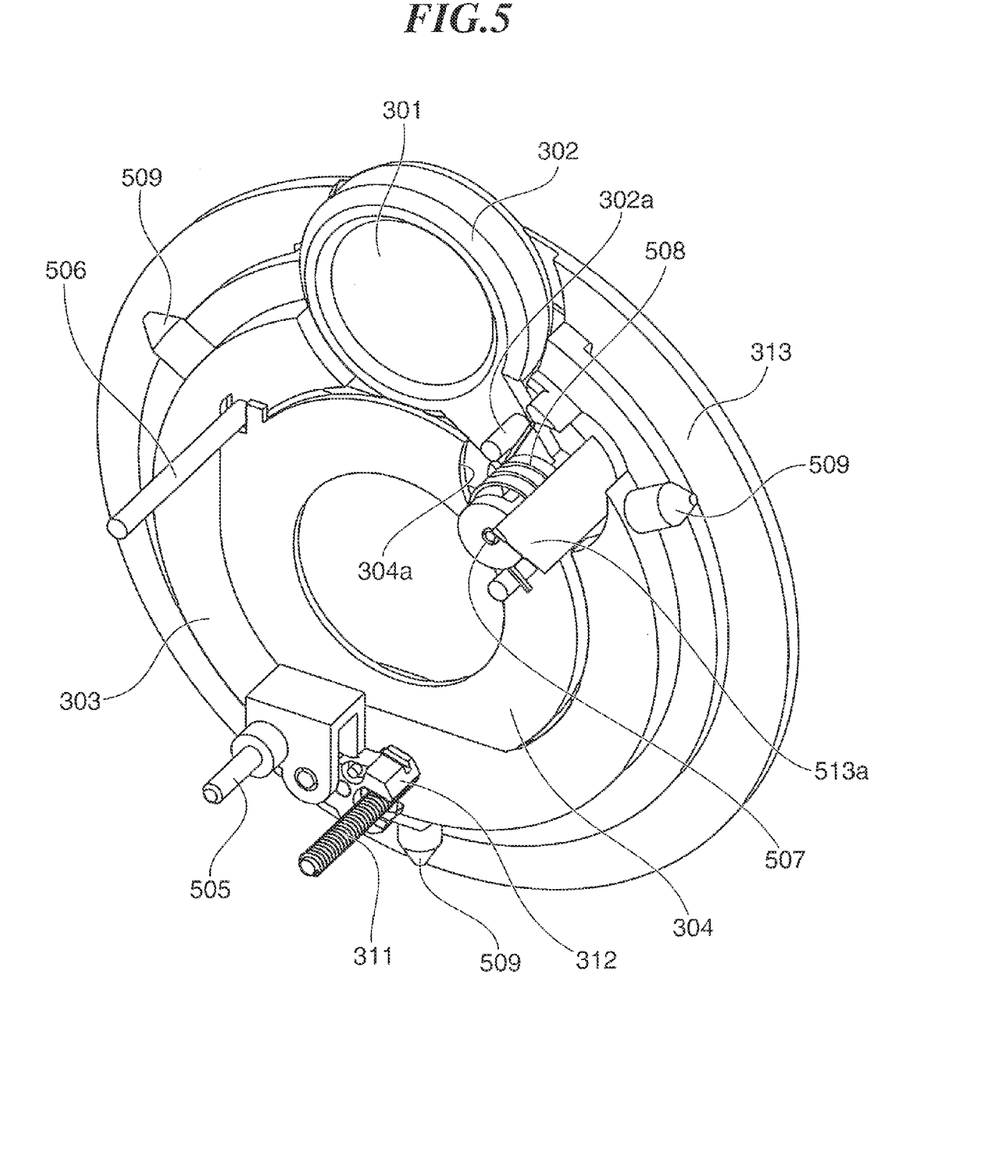
FIG. 5 is a perspective view showing a placement of a retractable lens group when the taking lens barrel in FIG. 3 lies in the retracted state.
Figure 6:
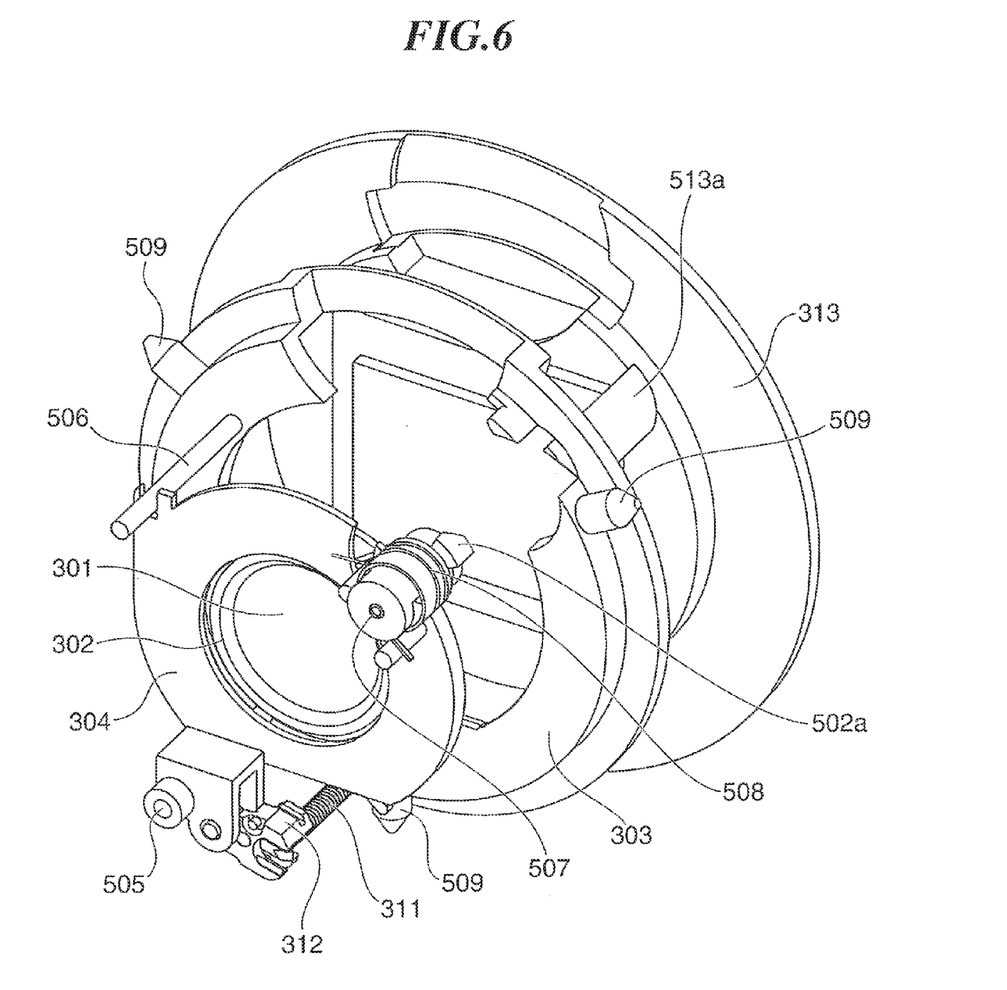
FIG. 6 is a perspective view showing a placement of the retractable lens group when the taking lens barrel in FIG. 3 lies in a shooting state.
Figure 7:
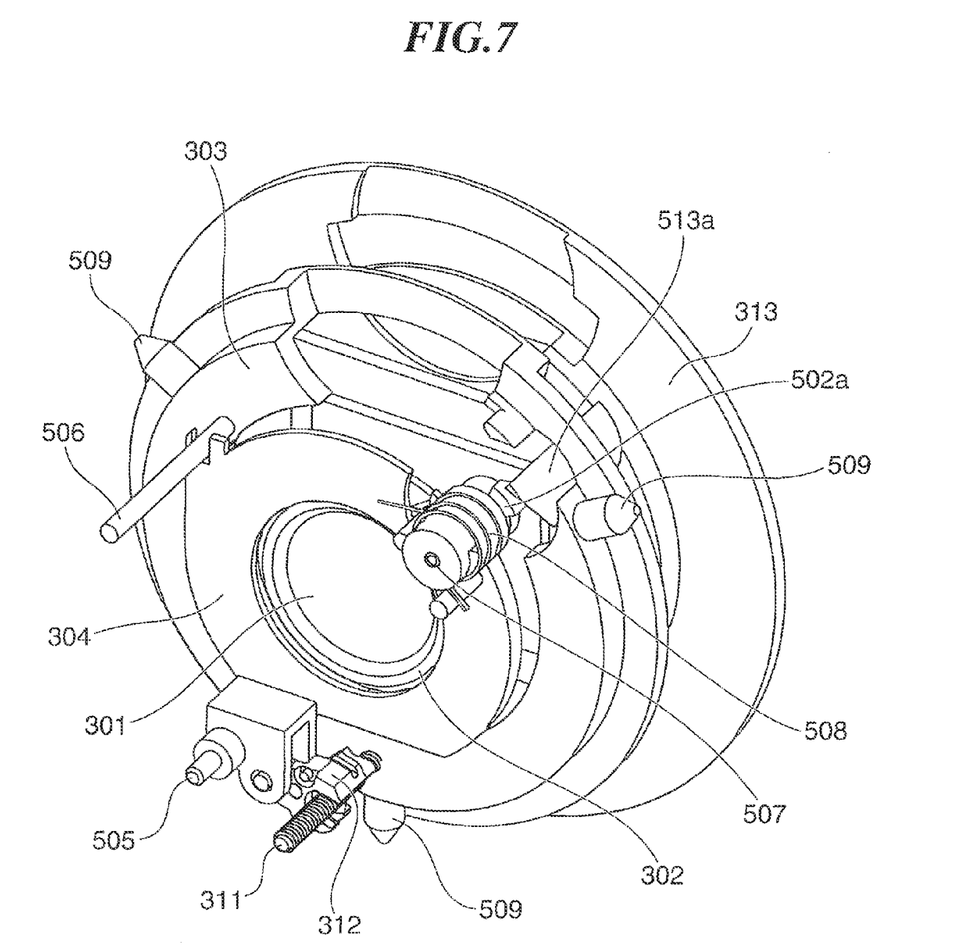
FIG. 7 is a view showing a state of the retractable lens group when the taking lens barrel in FIG. 3 shifts from the shooting state into the retracted state.

FIGS. 5 to 7 are perspective views showing a retracting structure of the retractable lens group 301. FIG. 5 is a perspective view showing a placement of the retractable lens group 301 when the taking lens barrel 150 lies in the retracted state. FIG. 6 is a perspective view showing a placement of the retractable lens group 301 when the taking lens barrel 150 lies in the shooting state. FIG. 7 shows a state of the retractable lens group 301 when the taking lens barrel 150 shifts from the shooting state into the retracted state.

A shaft member 507, which is shaped like a shaft, is mounted on the moving base 304. The retractable lens group holding member 302 is pivotally supported on the shaft member so as to be rotatable with respect to the shaft member 507. When the taking lens barrel 150 lies in the shooting state, a projecting portion 302a provided in the retractable lens group holding member 302 is stopped in a state of being with a cutaway portion 304a formed in the base member 304, and the retractable lens group holding member 302 is urged by a torsion spring 508 so that the retractable lens group holding member 302 can be held at the center of the optical axis with respect to the moving base 304.

A plurality of cam grooves is provided on an inner periphery of the drive ring 321, and a plurality of followers 509 provided in the moving group 303 follow the respective cam grooves so that the moving group 303 can move in the direction of the optical axis, and on this occasion, the moving group 303 is caused to advance straight by the fixed cam ring 320. The moving group 303 is equipped with a stepping motor 310 which is an actuator (see FIGS. 3 and 4). A guide bar 505 and a sub guide bar 506 are fixed to the moving group 303.

The lead screw 311 is mounted on the stepping motor 310, and the nut. 312 is engaged with the lead screw 311. The nut 312 is fixed to the moving base 304. Thus, when power from the zooming mechanism 252 rotates the drive ring 321 to move the moving group 303 in the direction of the optical axis, the moving base 304 moves in the direction of the optical axis integrally with the moving group 303. Then, when the stepping motor 310 is run, the moving base 304 moves in the direction of the optical axis in a state of being supported by the guide bar 505 and the sub guide bar 506 as the position of the nut 312 with respect to the lead screw 311 shifts. Because the moving base 304 can move in a stable condition in the direction of the optical axis while being supported by the guide bar 505 and the sub guide bar 506, the retractable lens group 301 held by the retractable lens group holding member 302 mounted on the moving base 304 can be held in a stable condition, and as a result, stable image quality can be realized.

Because the retractable lens group 301 is the focus lens, the digital camera 100 performs a focusing operation by running the stepping motor 310 according to a position at which an image of a subject is formed. Accordingly, the stepping motor 310 only has to be able to move the moving base 304.

The image pickup device holding member 313 disposed on the rear side of the retractable lens group holding member 302 is provided with a retracting lever 513a projecting toward the retractable lens group holding member 302. The retractable lens group holding member 302 is provided with a to-be-retracted lever 502a Referring to FIG. 7, with a retracting operation in which the taking lens barrel 150 is shifted from the shooting state into the retracted state, the retracting lever 513a gives rotative force to the to-be-retracted lever 502a. This rotates the retractable lens group holding member 302 as shown in FIG. 5, and as a result, the retractable lens group 301 held by the retractable lens group holding member 302 moves from the shooting position on the optical axis to the retracted position away from the optical axis. Thus, in the present embodiment, movement of the retractable lens group holding member 302 between the shooting position and the retracted position is realized by a simple arrangement.

As shown in FIGS. 5 to 7, when the retractable lens group holding member 302 has moved to the retracted position, the large portion of the retractable lens group 301 and the retractable lens group holding member 302 is housed in a concave portion formed by the image pickup device holding member 313 and the moving group 303. Because a retraction space for the retractable lens group holding member 302 is inside the constituent members of the taking lens barrel 150, the taking lens barrel 150 can be downsized, and by extension the digital camera 100 as a whole can be miniaturized.

When the retractable lens group holding member 302 moves to the retracted position, a force acts such that the retracting lever 513a pushes up the retractable lens group holding member 302 from the image pickup device holding member 313 side, and hence the retractable lens group holding member 302 causes the moving base 304 to lift toward a subject. The lifting of the moving base 304 is conspicuous in a part supported by the sub guide bar 506. Accordingly, when the taking lens barrel 150 is to be retracted, the retractable group lifting preventive spring (see FIG. 3) provided in the second lens group holding member 317 located in front of the retractable lens group holding member 302 urges the moving base 304 rearward so as to prevent the moving base 304 from lifting.

It should be noted that as for a method of preventing the moving base 304 from lifting, the same effects can be obtained by moving the second lens group holding member 317 and the moving base 304 closer to each other so that the space between the second lens group holding member 317 disposed on the subject side and the moving base 304 can be kept narrow so as to prevent the moving base 304 from lifting.

Figure 8:
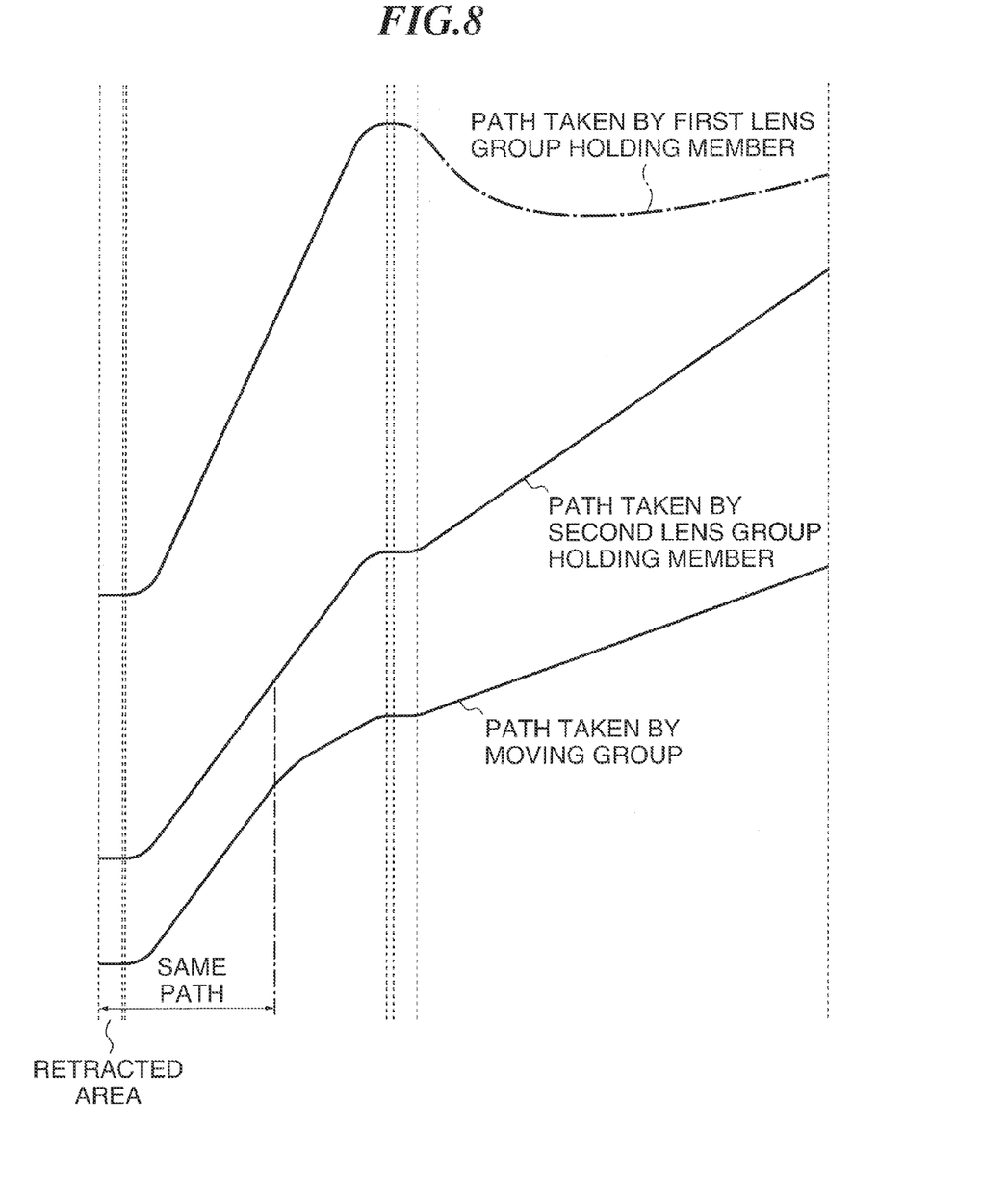
FIG. 8 is a view showing paths taken by respective lens group holding members included in the taking lens barrel in FIG. 3.

FIG. 8 is a view showing paths taken by the respective lens group holding members included in the taking lens barrel 150. When the taking lens barrel 150 is to be retracted (collapsed), the moving base 304 and the second lens group holding member 317 move in the direction of the optical axis while taking substantially the same path in the state of being close to each other. As a result, the space between the moving base 304 and the second lens group holding member 317 can be kept constant, which prevents the moving base 304 from lifting.

In a sequence for shifting the taking lens barrel 150 from the shooting state into the retracted state by collapsing it, first, the stepping motor 310 is run to move the moving base 304 closer to the moving group 303. Namely, the taking lens barrel 150 is shifted from the shooting state in FIG. 6 into the retracting state in FIG. 7. In the state shown in FIG. 7, the retracting lever 513a has not yet come into abutment with the to-be-retracted lever 502a. Thereafter, when a retracting operation is performed in which the moving group 303 is moved to the retracted position by rotating the drive ring 321 using power from the zooming mechanism 252, the retracting lever 513a gives rotative force to the to-be-retracted lever 502a in response to the above movement, and as a result, the retractable lens group holding member 302 moves from the shooting position to the retracted position. Further, the stepping motor 310 is driven to bring the moving base 304 into abutment with the moving group 303. This brings the entire taking lens barrel 150 into the retracted state in FIG. 5.

Figure 9:
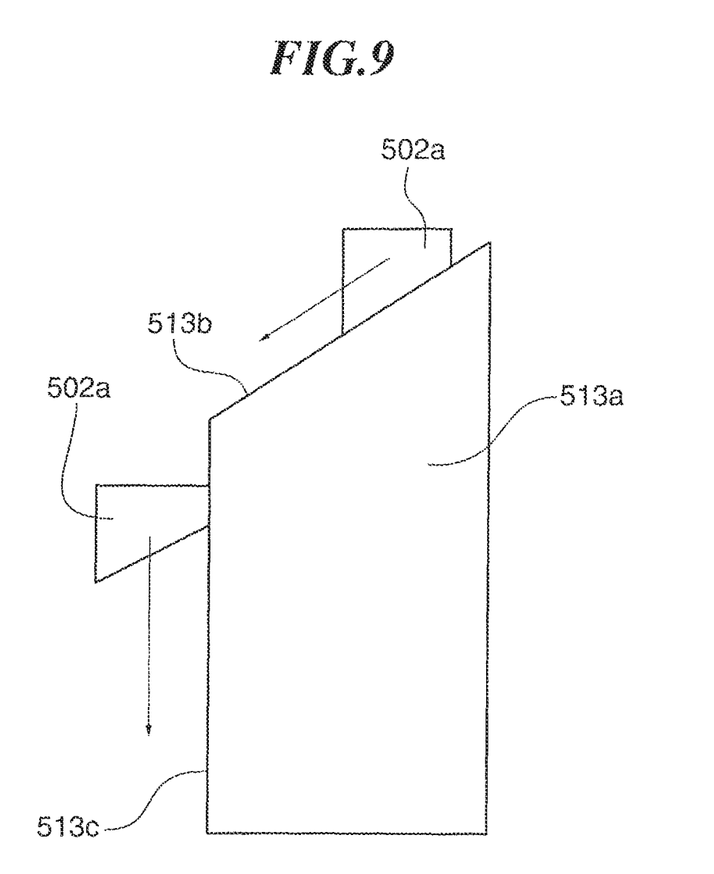
FIG. 9 is a view showing how a to-be-retracted lever moves when a retractable lens group holding member included in the taking lens barrel in FIG. 3 is retracting.

FIG. 9 is a view showing how the to-be-retracted lever 502a moves when the retractable lens group holding member 302 is retracting. The to-be-retracted lever 502a comes into contact with a tapered portion 513b of the retracting lever 513a and slides along the tapered portion 513b, causing the retractable lens group holding member 302 to rotate in a retracting direction. The to-be-retracted lever 502a then finishes abutting on the tapered portion 513b and moves in a retracting direction on a side wall portion 513c.

In the above described sequence, using the retracting lever 513a and the to-be-retracted lever 502a eliminates the need to rotate the retractable lens group holding member 302 by driving force of the stepping motor 310, and as described earlier, the stepping motor 310 has only to be able to move the moving base 304. Therefore, the stepping motor 310 does not have to generate high torque, and upsizing of the stepping motor 310 can be avoided. Moreover, before the to-be-retracted lever 502a comes into abutment with the retracting lever 513a, the moving base 304 and the second lens group holding member 317 take substantially the same path in the state of being close to each other as shown in FIG. 8, the retractable lens group holding member 302 can be retracted with good timing.

As described above, according to the present embodiment, the retractable lens group holding member 302 holding the retractable lens group 301 is pivotally supported on the shaft member 507 provided in the moving base 304 and held on the moving base 304 so as to be retractable. Moreover, because the moving base 304 is supported by the guide bar 505 and the sub guide bar 506, the retractable lens group 301 can be held in a stable condition during shooting, and stable image quality can be realized.

Moreover, because the moving base 304 and the second lens group holding member 317 take substantially the same path in the state of being close to each other when the taking lens barrel 150 is to collapse, the retractable lens group holding member 302 can be retracted with good timing while the moving base 304 is prevented from lifting. Further, because the retraction space for the retractable lens group holding member 302 is provided inside the constituent members of the taking lens barrel 150, the taking lens barrel 150 can be miniaturized, and by extension the digital camera 100 as a whole can be miniaturized.

It should be noted that although in the embodiment described above, the stepping motor 310 is used as an actuator that drives the moving base 304, this is not limitative, but a voice coil motor may be used.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-086664 filed Apr. 17, 2013, which is hereby incorporated by reference herein in its entirety.

What is claimed is:

1. A lens barrel comprising:
a lens;
a first holding member configured to hold said lens;
a second holding member configured to hold said first holding member and be movable in a direction of an optical axis in conjunction with said first holding member;
a drive mechanism configured to move said first holding member between a shooting position on the optical axis and a retracted position outside the optical axis; and
a first guide bar and a second guide bar configured to support said second holding member;
a third holding member configured to have said first guide bar and said second guide bar fixed thereto and be movable in the direction of the optical axis; and
an urging member configured to urge said second holding member toward said third holding member,
wherein said drive mechanism retracts said first holding member from the shooting position to the retracted position while holding said second holding member on the optical axis,
said first guide bar and said second guide bar guide said second holding member in the direction of the optical axis, and
at the time of shifting from a shooting state into a retracted state, said third holding member moves toward an image plane, and said drive mechanism retracts said first holding member from the shooting position to the retracted position in a state where said second holding member is urged toward said third holding member by said urging member.

2. The lens barrel according to claim 1, wherein
in the shooting state, said first holding member is disposed at the shooting position, and
in the retracted state, said first holding member is disposed at the retracted position.

3. The lens barrel according to claim 1, wherein at the time of shifting from the shooting state into the retracted state, said drive mechanism retracts said first holding member from the shooting position to the retracted position in a state where said second holding member and said third holding member are moving in the direction of the optical axis while taking the same path.

4. A lens barrel comprising:
a lens;
a first holding member configured to hold said lens;
a second holding member configured to hold said first holding member and be movable in a direction of an optical axis in conjunction with said first holding member;
a drive mechanism configured to move said first holding member between a shooting position on the optical axis and a retracted position outside the optical axis;
a first guide bar and a second guide bar configured to support said second holding member;
an image pickup device disposed on an image plane side of said second holding member; and an image pickup device holding member configured to have a retracting lever that projects toward said second holding member and hold said image pickup device, wherein said drive mechanism retracts said first holding member from the shooting position to the retracted position while holding said second holding member on the optical axis, said first guide bar and said second guide bar guide said second holding member in the direction of the optical axis, said first holding member has a to-be-retracted lever that moves said first holding member to the retracted position by rotative force given by the retracting lever, and the retracting lever and the to-be-retracted lever constitute said drive mechanism.

5. An image pickup apparatus comprising:
a lens barrel comprising:
a lens,
a first holding member that holds the lens,
a second holding member that holds the first holding member and is movable in a direction of an optical axis in conjunction with the first holding member,
a drive mechanism that moves the first holding member between a shooting position on the optical axis and a retracted position outside the optical axis,
a first guide bar and a second guide bar that support the second holding member,
a third holding member that has the first guide bar and the second guide bar fixed thereto and be movable in the direction of the optical axis, and
an urging member that urges the second holding member toward the third holding member,
wherein the drive mechanism retracts the first holding member from the shooting position to the retracted position while holding the second holding member on the optical axis, the first guide bar and the second guide bar guide the second holding member in the direction of the optical axis, and at the time of shifting from a shooting state into a retracted state, the third holding member moves toward an image plane, and the drive mechanism retracts the first holding member from the shooting position to the retracted position in a state where the second holding member is urged toward the third holding member by the urging member.

6. An image pickup apparatus comprising:
a lens barrel comprising:
a lens,
a first holding member that holds the lens,
a second holding member that holds the first holding member and is movable in a direction of an optical axis in conjunction with the first holding member,
a drive mechanism that moves the first holding member between a shooting position on the optical axis and a retracted position outside the optical axis,
a first guide bar and a second guide bar that support the second holding member,
an image pickup device disposed on an image plane side of the second holding member; and
an image pickup device holding member that has a retracting lever that projects toward the second holding member and hold the image pickup device,
wherein the drive mechanism retracts the first holding member from the shooting position to the retracted position while holding the second holding member on the optical axis, the first guide bar and the second guide bar guide the second holding member in the direction of the optical axis, the first holding member has a to-be-retracted lever that moves the first holding member to the retracted position by rotative force given by the retracting lever, and the retracting lever and the to-be-retracted lever constitute the drive mechanism.

7. A lens barrel comprising:
a focus lens;
a zoom lens configured to be arranged at a subject side of said focus lens;
a first holding member configured to hold said focus lens;
a second holding member configured to hold said first holding member and be movable in a direction of an optical axis in conjunction with said first holding member;
a third holding member configured to hold said zoom lens;
a cam ring having a cam groove on an inner periphery thereof;
a drive mechanism configured to move said first holding member between a shooting position on the optical axis and a retracted position outside the optical axis; and
a guide bar configured to support said second holding member,
wherein said third holding member follows the cam groove to move in the direction of the optical axis,
wherein said drive mechanism retracts said first holding member from the shooting position to the retracted position while holding said second holding member on the optical axis, and
wherein said guide bar guides said second holding member in the direction of the optical axis.

8. An image pickup apparatus comprising:
a lens barrel comprising:
a focus lens;
a zoom lens configured to be arranged at a subject side of said focus lens;
a first holding member configured to hold said focus lens;
a second holding member configured to hold said first holding member and be movable in a direction of an optical axis in conjunction with said first holding member;
a third holding member configured to hold said zoom lens;
a cam ring having a cam groove on an inner periphery thereof;
a drive mechanism configured to move said first holding member between a shooting position on the optical axis and a retracted position outside the optical axis; and
a guide bar configured to support said second holding member,
wherein said third holding member follows the cam groove to move in the direction of the optical axis,
wherein said drive mechanism retracts said first holding member from the shooting position to the retracted position while holding said second holding member on the optical axis, and
wherein said guide bar guides said second holding member in the direction of the optical axis.

* * * * *